Figure 1:
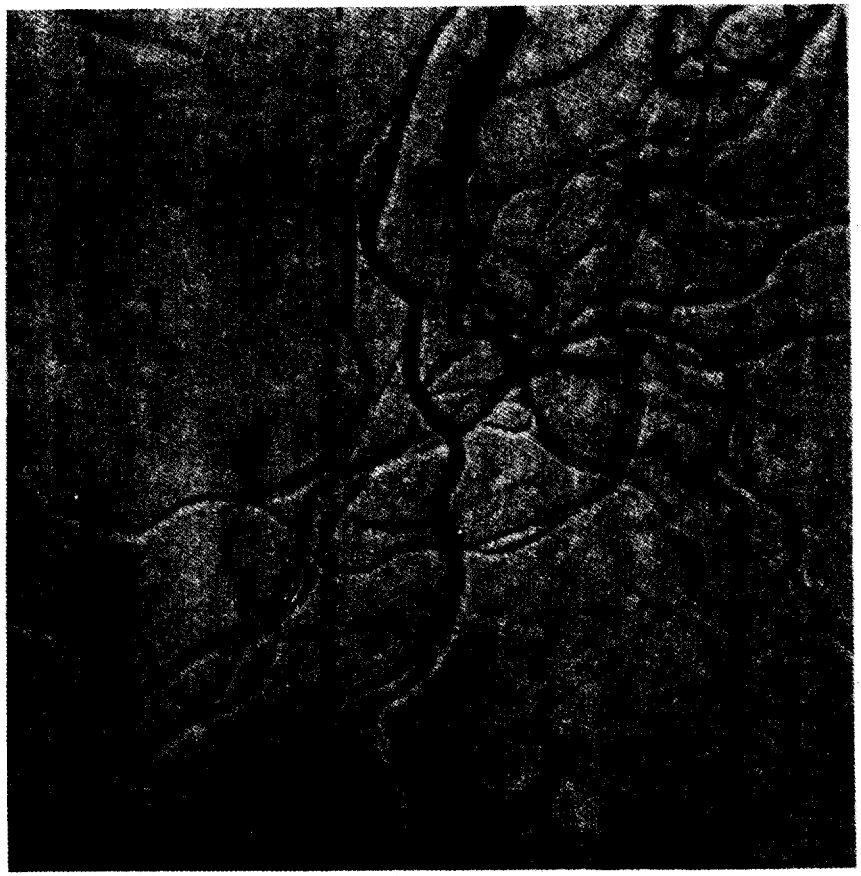

Jan. 12, 1960  W. C. HOWELL, JR., ET AL  2,920,718
AIR FILTER

Filed April 27, 1955  2 Sheets-Sheet 1

←|MICRON|→

William C. Howell, Jr.
Charles E. Paxton    Inventors
John J. Kolfenbach

By Frank T. Johmann  Attorney

←|MICRON|→

William C. Howell, Jr.
Charles E. Paxton      Inventors
John J. Kolfenbach

By Frank T. Johnmann   Attorney

United States Patent Office 2,920,718
Patented Jan. 12, 1960

2,920,718
AIR FILTER

William C. Howell, Jr., Union, Charles E. Paxton, Jamesburg, and John J. Kolfenbach, North Plainfield, N.J., assignors to Esso Research and Engineering Company, a corporation of Delaware Application April 27, 1955, Serial No. 504,306

3 Claims. (Cl. 183—51)

This invention relates to oil compositions and more particularly relates to oil compositions containing small amounts of a mixture of long-fibered lithium and calcium soaps, which compositions are especially useful as air filter oils.

In the prior art it has been the practice for some time to dip air filters, such as are used in air straining or conditioning apparatus and the like, containing stranded, matted, or fibrous material, or metal screen mazes, into oil or oily material to improve their dust absorptive or dust holding capacity. Such filters, as is well known, usually contain a mat of fibers arranged criss-cross and miscellaneously or contain a maze of fine mesh wire screen so that air passing through the filter must move in a devious path. By the use of an adherent film of oil, or the like, the dust particles entrained in the air are extracted and held by the filter fibers or screen. Such filters are widely used in space heating systems, air conditioning systems, in the intakes of refrigeration apparatus and various types of internal combustion engines, in railroad locomotive and car bodies, as well as in many other locations and installations. The conditions of temperature, air velocity, etc., vary widely for different installations.

One particular installation where difficulty has been encountered in obtaining an oil of optimum tackiness, or adhesive qualities, is in the intake air filters and car body filters of diesel locomotives. Diesel locomotives are driven by internal combustion engines of relatively large horsepower, having large air requirements. It has been the practice in the past to provide such locomotives with a fibrous or wire screen filter which is dipped in a mineral base oil, usually an oil of lubricating grade and viscosity. Such oils tend largely to drip off the filter, especially at the relatively elevated operating temperatures of diesel locomotive engines. This tendency may be less pronounced in other filters where air is filtered at less elevated temperatures, but it exists to a greater or lesser degree in all types of oil treated fibrous or screen filter media.

Improved air filter oils have been prepared in the prior art containing small amounts of polymeric materials such as polyethylene, polybutene or combinations of polybutene with lithium stearate, which additives reduce the tendency of the filter oils to drip off the filter. However, such compositions have not been entirely successful since even these improved compositions have the disadvantage of losing a considerable amount of the filter oil after extended periods of operation at elevated temperatures which results in a marked decrease in the efficiency of the air filter to remove finely divided solid particles (dust) from the air.

It has now been found that the addition of a small amount of a mixture of long-fibered lithium and calcium soaps to an air filter oil substantially improves the filter retention properties thereof. The novel air filter oil compositions of this invention are superior to those of the prior art in this respect, and in addition are also useful for lubricating machinery employed in the textile industry where it is essential that lubricating oil compositions be retained in the bearings, twister rings, combers and the like and thus not to drip or fling off onto the textiles. The oil compositions of this invention are stable at elevated temperatures (e.g. 200° F.) and are also water resistant, which properties are important for commercially successful air filter oils. In addition, the oil compositions of this invention have lower viscosities than conventional air filter oils and are thus easier to handle and apply to the fibrous or screen air filter media.

In accordance with the present invention, a small amount of a mixture of long-fibered lithium and calcium soaps of high molecular weight fatty acids are added to oils conventionally utilized for air filter oil compositions, the molar ratio of lithium soap to calcium soap in the mixture being between about 2:1 to 8:1. Preferably, the molar ratio of lithium soap to calcium soap in the soap mixture is between about 3:1 to 5:1, a particularly preferred molar ratio being about 4:1.

Figure 2:
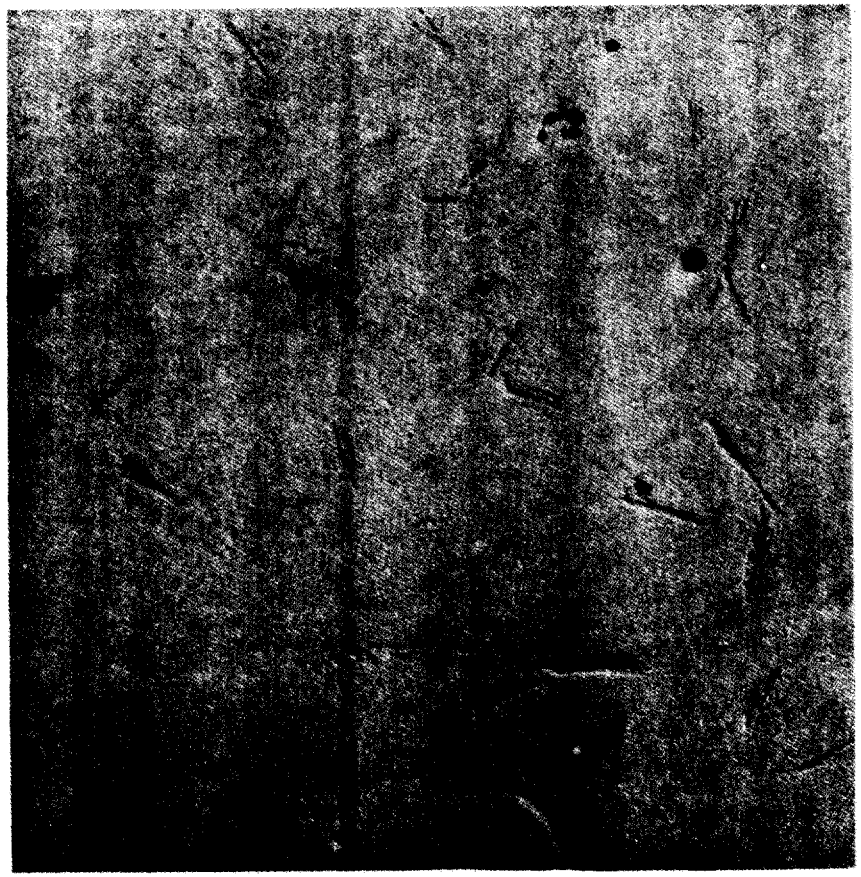

It is believed that the desirable properties of the present air filter oil compositions are due to the presence of long stringy soap fibers. Fig. 1 is an electron microscope photograph of a mixture of lithium and calcium soap fibers of a particularly preferred soap mixture useful in this invention. Fig. 2, on the other hand, shows the fiber structure of lithium stearate which has been employed in filter oil compositions of the prior art. It will be noted that there is a substantial difference in the length and stringiness of the fibers of the soaps shown in Fig. 1 and Fig. 2. The lengths of the soap fibers shown in Fig. 1 average over 12 microns, whereas the length of the soap fibers shown in Fig. 2 average only about 1 micron.

In accordance with the present invention, the major proportion of the soap fibers are at least about 5 microns in length and are preferably at least about 10 microns in length. The average fiber length of the mixed lithium and calcium soaps of this invention preferably average at least about 10 microns in length.

The fatty acids employed to form the mixed lithium and calcium soaps of this invention may be any of the commonly-known grease-making materials. The grease-making fatty acids may be saturated or unsaturated, with slightly unsaturated acids being preferred since they promote the formation of long stringy soap fibers. Generally, the fatty acids useful in this invention contain 12 to 22 carbon atoms and preferably about 14 to 18 carbon atoms per molecule. Mixtures of fatty acids may be employed. Specific examples of fatty acids which may be employed include hydrogenated fish oil acids, beef or mutton fat tallow, hydrolyzed tallow, stearic acid, oleic acid, hydroxy stearic acid, myristic acid, palmitic acid or any of the glycerides of the above-mentioned acids. Of the unsaturated acids, those having iodine numbers of about 40 to 60 are most readily available. However, acids having iodine numbers falling within the wide range of 0 to 150 are also useful. Particularly preferred fatty acids which may be employed in the present invention are commercial animal fatty acids from hydrolyzed tallow which have an iodine number of about 40, a saponification number of about 200 and have the following approximate composition:

| Acid: | Wt. percent |
|---|---|
| Myristic | 3.0 |
| Palmitic | 29.0 |
| Stearic | 18.5 |
| Oleic | 46.5 |
| Linoleic | 3.0 |
| | 100.0 |

The mixtures of lithium and calcium soaps may be prepared as such or may be prepared in the form of a grease which may be then added to the air filter oil to form oil compositions in accordance with this invention. The latter method, that is, the preparation of the soap mixture in the form of a grease, is preferred since this method affords good process control promoting the formation of long stringy soap fibers. A particularly desired method of manufacture is one which comprises neutralizing the fatty acid with basic reacting compounds of lithium and calcium in the presence of a lubricating oil, dehydrating the blend at a temperature below the melting point of the lithium and calcium soaps and then cooling the blend down with stirring. Such a method of preparation was employed to form the soap fibers shown in Fig. 1.

More specifically, the soap mixture of this invention may be prepared in the following manner. The fatty acid and a portion of the lubricating oil (35 to 200 S.S.U. at 210° F., preferably a mineral oil having a viscosity of about 50 to 80 S.S.U. at 210° F.), say about ⅓ to ¾ of the total oil, may be added to a steam-heated grease kettle. The temperature of the kettle may then be gradually raised to about 130° to 170° F. and hydrated lime—calcium hydroxide—added. Stirring is commenced and the temperature may be gradually raised while lithium hydroxide is added. However, if desired, the hydrated lime and the lithium hydroxide may be added before heating is started. The grease is heated until it is essentially dehydrated at a temperature in the range of about 260° to 310° F., which temperature is substantially below the melting point of the soap formed. Then the heat is shut off and the balance of cold oil may be added in incremental amounts at this point, or the soap concentrate may first be cooled to a temperature of about 180° to 200° F. before adding the balance of the oil.

The mixture may then be subjected, if desired, to the action of high rates of shear (e.g., 100,000 reciprocal seconds) in a milling device, such as a Morehouse mill, a Charlotte mill, ink mill, Gaulin homogenizer, three-roll paint mill or similar device, entering the mill at a temperature of, say, about 100° to 150° F. to be heated by the milling action to a temperature not exceeding 200° F.

Rather than adding all the fatty acids initially, it may be desirable to charge first only enough of the fatty acids to neutralize the lime and after neutralization add the lithium hydroxide solution and the remainder of the fatty acids. Also, the lithium hydroxide may be added to the charge prior to the lime.

Greases containing in the range of about 5 to 50 wt. percent of the soap mixture of this invention may be prepared in accordance with the aforedescribed procedure. Generally when this method is employed, greases containing about 6 to 20 wt. percent of the soap mixture will be prepared. The dehydration of the grease may be accomplished at temperatures as low as about 220° F., the preferred dehydration temperature range being about 260° to 320° F. The method described above is a particularly preferred method since it produces lithium-calcium soap mixtures having unusually long and stringy fibers.

The oils utilized in preparing air filter oil compositions of this invention may be mineral, animal, vegetable or synthetic oils or mixtures thereof. Preferably, the oils employed are conventionally refined mineral lubricating oils obtained from paraffinic or naphthenic crude sources. In general, the oils will have a viscosity in the range of about 40 to 100 seconds S.S.U. at 210° F., although if desired oils of somewhat higher or lower viscosities may be employed. Preferred oils have an S.S.U. viscosity at 210° F. in the range of about 50 to 80 seconds.

The oil compositions of this invention comprise a major proportion of an oil of lubricating viscosity, preferably, as stated heretofore, an oil having an S.U.S. viscosity at 210° F. of about 40 to 100 seconds. In general, the filter oil compositions of this invention will contain about 90 to 98% by weight, based on the total composition, of the lubricating oil. The proportion of the mixture of lithium and calcium soaps in the oil composition should be in the range of about 0.05 to 2.0% by weight, preferably about 0.1 to 0.5% by weight, based on the total composition. A particularly preferred concentration of the soap mixture is in the range of about 0.2 to 0.4% by weight, based on the total composition. Such concentrations of the soap mixture are especially useful on railroad car body and engine intake air filters giving coatings in the range of about 5 to 40 ounces per standard 20″ x 20″ x 2″ filter, which coatings have been found to give outstanding air filter results. The viscosity of the total filter oil composition will, in general, be in the range of about 70 to 90 seconds S.S.U. at 210° F. and preferably in the range of about 75 to 85 seconds S.S.U. at 210° F.

It will be understood that other additive materials may be added to the air filter oil compositions of this invention to impart special properties. For example, anti-oxidants, such as phenyl alpha naphthylamine; anti-foaming agents, such as dimethyl silicone polymers; supplementary tackiness agents, such as high molecular weight polybutene, isobutylene-styrene copolymers, etc., may be added in small concentrations (e.g. 0.0001 to 5 wt. percent concentrations, based on the total composition).

The invention will be more fully understood by reference to the following examples. It is pointed out, however, that the examples are given for the purpose of illustration only and are not to be construed as limiting the scope of the present invention in any way.

EXAMPLE I

Five air filter oil compositions (one formulated in accordance with the present invention; and four conventional compositions of the prior art) were evaluated for their retention properties on a section of a full-scale wire mesh impingement type air filter. A 7″ x 7″ x 2″ section of a standard reusable coated impingement type air filter was employed in these retention tests. The standard air filter is manufactured by the Farr Company, Model 11-47, and comprises a frame or housing provided with an air inlet, an air outlet and a maze of fine mesh wire screen arranged within the frame. The wire screen is quite similar to conventional window screens in mesh and wire diameter. The maze of wire screen in the standard filter occupies a volume of about 20″ x 20″ x 2″.

In carrying out the retention tests, the aforementioned air filter section was dipped in the air filter oil composition being evaluated to thereby coat the section with the filter oil composition, the section removed from the air filter oil composition and allowed to drain for ½ hour at room temperature and thereafter conditioned for 1 hour by standing at a temperature of 200° F. Then the conditioned filter was stored for 20 hours at 200° F. and the loss of the air filter oil during the 20 hours of storage was measured. The ounces of air filter oil retained on the filter after conditioning and after 20 hours of storage at 200° F. on the 7″ x 7″ x 2″ section were then extrapolated to a full size 20″ x 20″ x 2″ air filter the results being shown below in Table I.

The following air filter oil compositions were evaluated in the aforedescribed retention test:

*Filter oil composition of the present invention*

*Filter oil A.*—This filter oil composition consisted essentially of about 98% by weight of a mineral lubricating oil having a viscosity of about 70 seconds S.S.U. at 210° F. and 2% by weight of a grease A. Grease A contained about 12.9 wt. percent of a mixture of lithium and calcium soaps of animal fatty acids obtained from hydrolyzed tallow. The properties and approximate composition of these fatty acids have been set forth heretofore in this specification. The molar ratio of lithium soap to calcium soap in the soap mixture was about 4:1. Grease A was prepared from the following ingredients:

| Ingredients of grease A: | Wt. percent |
|---|---|
| Animal fatty acids | 12.60 |
| Lithium hydroxide monohydrate | 1.52 |
| Hydrated lime (71% CaO) | 0.71 |
| Mineral oil (70 SUS/210° F.) | 85.17 |

Grease A was prepared substantially in the following manner: The fatty acids and about one-half of the mineral oil were added to a steam kettle and the hydrated lime was stirred in at a temperature of about 166° F. Heating and stirring were continued and the lithium hydroxide was added as a 10% aqueous solution at about 210° F. The grease was then further heated to about 289° F. to dehydration (heating time above 250° F. was about 55 minutes). During this period the viscosity of the mass was cut down by the addition of small amounts of oil. Thereafter the heat was shut off and the balance of the cold oil was added while stirring over a period of about 1.5 hours. None of the grease was melted during the process. After the addition of all the oil, the grease was homogenized in a Gaulin homogenizer. Filter oil A thus contained about 0.26% by weight of soap.

Conventional filter oil compositions

*Filter oil B.*—This composition consisted essentially of a major proportion of an oil of lubricating viscosity containing dissolved therein about 2% by weight of polyethylene resin.

*Filter oil C.*—This composition consisted essentially of a major proportion of a mineral oil of lubricating viscosity containing a small amount of lithium stearate and about 1% by weight of polybutene.

*Filter oil D.*—This composition consisted essentially of a major proportion of a mineral oil of lubricating viscosity, a small amount of lithium stearate and about 1% by weight of polybutene.

*Filter oil E.*—This composition consisted essentially of a major proportion of a mineral oil of lubricating viscosity and about 2% by weight of polyethylene resin.

The viscosities of the aforedescribed air filter oils and their performance in the aforedescribed air filter retention tests are shown below in Table I:

TABLE I

| | Present Invention | Conventional | | | |
|---|---|---|---|---|---|
| Filter Oil | A | B | C | D | E |
| Ounces of Oil Retained on Filter [1]: | | | | | |
| After Conditioning | 30.2 | 22.0 | 38.0 | 39.3 | 18.8 |
| After 20 Hrs./200° F | 24.0 | 10.5 | 23.5 | 21.6 | 7.2 |
| Decrease, Ounces | 6.2 | 11.5 | 14.5 | 17.7 | 11.6 |
| Decrease, Percent | 21 | 52 | 38 | 45 | 62 |
| Viscosity of Air Filter Oils: | | | | | |
| Vis./210° F., SUS | 79.6 | 138.0 | 205.5 | 121.4 | 155.7 |
| Vis./100° F., SUS | 1,212 | 1,514 | 2,022 | 1,419 | 3,506 |

[1] Based on a full size 20" x 20" x 2" air filter.

It will be noted from Table I that on the basis of either (1) percent decrease in coating weight or (2) the number of ounces of coating lost, filter oil A prepared in accordance with this invention was superior to all of the conventional filter oils (B—E) in resistance to dripping from the filters when exposed to high temperatures.

EXAMPLE II

The air filter retention test set forth in Example I was repeated employing the following additional air filter oil compositions:

*Air filter oil composition of the present invention*

*Filter oil F.*—This oil composition consisted essentially of a mineral lubricating oil having an S.S.U. viscosity at 210° F. of about 70 containing dissolved therein about 2.5 wt. percent of Grease A (described in detail in Example I) and about 0.0005 wt. percent of a dimethyl silicone oil having a viscosity of about 30,000 centistokes at 25° C., the percentages being expressed on total composition. Filter oil F thus contained about 0.32% by weight of soap.

Conventional air filter composition

*Filter oil G.*—This composition consisted essentially of about 98% of a mineral oil (having an S.S.U. viscosity at 210° F. of about 70 seconds) and 2% by weight of a polyethylene resin.

Shown below in Table II are the viscosities of these two air filter oil compositions and the results of their performance in the aforedescribed air filter oil retention test.

TABLE II

| | Present Invention | Conventional |
|---|---|---|
| Filter Oil | F | G |
| Ounces of Oil Retained on Filter After Storage [1]: | | |
| ½ Hr. @ R.T | 34.1 | 37.7 |
| 1 Hr. @ 200° F | 28.6 | 15.8 |
| 5 Hr. @ 200° F | 24.6 | 13.2 |
| 21 Hr. @ 200° F | 18.8 | 10.0 |
| Viscosity of Air Filter Oil: | | |
| Vis. @ 210° F | 85.1 | 179.5 |
| Vis. @ 100° F | 1,332.0 | 4,130.0 |

[1] Based on a full size 20" x 20" x 2" air filter.

Again it will be noted that the loss of filter oil in the case of filter oil F, which was prepared in accordance with the present invention, was substantially less than that of filter oil G, which was a conventional air filter oil.

Filter oils A and F of the present invention were also evaluated in a "wicking" test, which test is a measure of the ability of an oil to wet and retain dust particles. In this test, the rate of "wicking" of the filter oil through successive layers of accumulated dust is measured. Filter oils A and F gave excellent results in the "wicking" test.

What is claimed is:

1. An improved air filter of the oil-wet impingement type comprising a frame provided with an air inlet and air outlet, a maze of fibrous material arranged within said frame and coated with an oil composition comprising a major proportion of a lubricating oil having an SSU viscosity at 210° F. of about 40–100 seconds, and about 0.05 to 2.0 percent by weight, based on the total composition, of a mixture of lithium and calcium soaps of high molecular weight fatty acid, the molar ratio of lithium soap to calcium soap in said mixture being about 2:1 to 8:1, the major proportion of the fibers of said soaps being at least about 5 microns in length, said coated maze being adapted to remove finely divided solid particles from air passing through said filter.

2. An improved air filter of the oil-wet impingement type provided with an air inlet and air outlet, a maze of fine mesh wire screen arranged within said frame and coated with an oil composition comprising a major proportion of a lubricating oil having an SSU viscosity at 210° F. of about 40–100 seconds, and about 0.05 to 2.0 percent by weight, based on the total composition, of a mixture of lithium and calcium soaps of high molecular weight fatty acid, the molar ratio of lithium soap to calcium soap in said mixture being about 2:1 to 8:1, the major proportion of the fibers of said soaps being at least about 5 microns in length, said coated maze being adapted to remove finely divided solid particles from air passing through said filter.

3. An improved air filter of the oil-wet impingement type comprising the frame provided with an air inlet and air outlet, a maze of fine mesh wire screen arranged within said frame and coated with an oil composition comprising the major proportion of mineral lubricating oil having an SSU viscosity at 210° F. of about 50–80 seconds and about 0.1 to 0.5 percent by weight, based on the total composition of a mixture of lithium and calcium soaps of high molecular weight fatty acid containing in the range of about 14–18 carbon atoms per molecule, the molar ratio of lithium soap to calcium soap in said mixture being between about 3:1 to 5:1, the major proportion of the fibers of said soaps being at least about 10 microns in length, said coated maze being adapted to remove finely divided solid particles from air passing through said filter.

References Cited in the file of this patent

UNITED STATES PATENTS

| | | |
|---|---|---|
| 2,145,898 | Simpson | Feb. 7, 1939 |
| 2,569,575 | Philipps | Oct. 2, 1951 |
| 2,641,577 | O'Halloran | June 9, 1953 |
| 2,732,356 | Paxton | Jan. 24, 1956 |